May 14, 1963 W. F. COUSINO 3,089,368
METHOD AND APPARATUS FOR CUTTING OFF ELONGATED MATERIALS
Filed Jan. 21, 1963 5 Sheets-Sheet 1
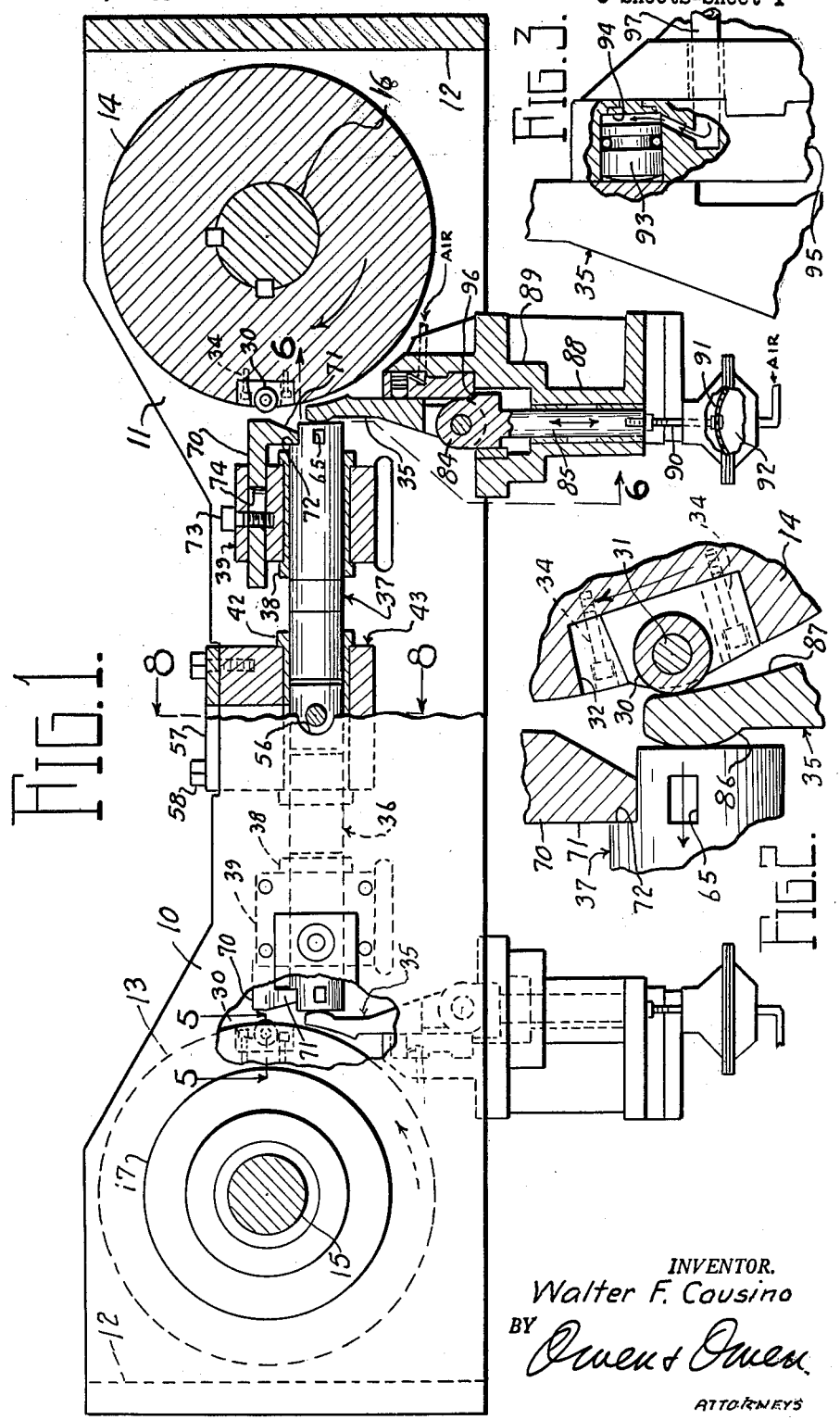
INVENTOR.
Walter F. Cousino
BY Owen & Owen
ATTORNEYS

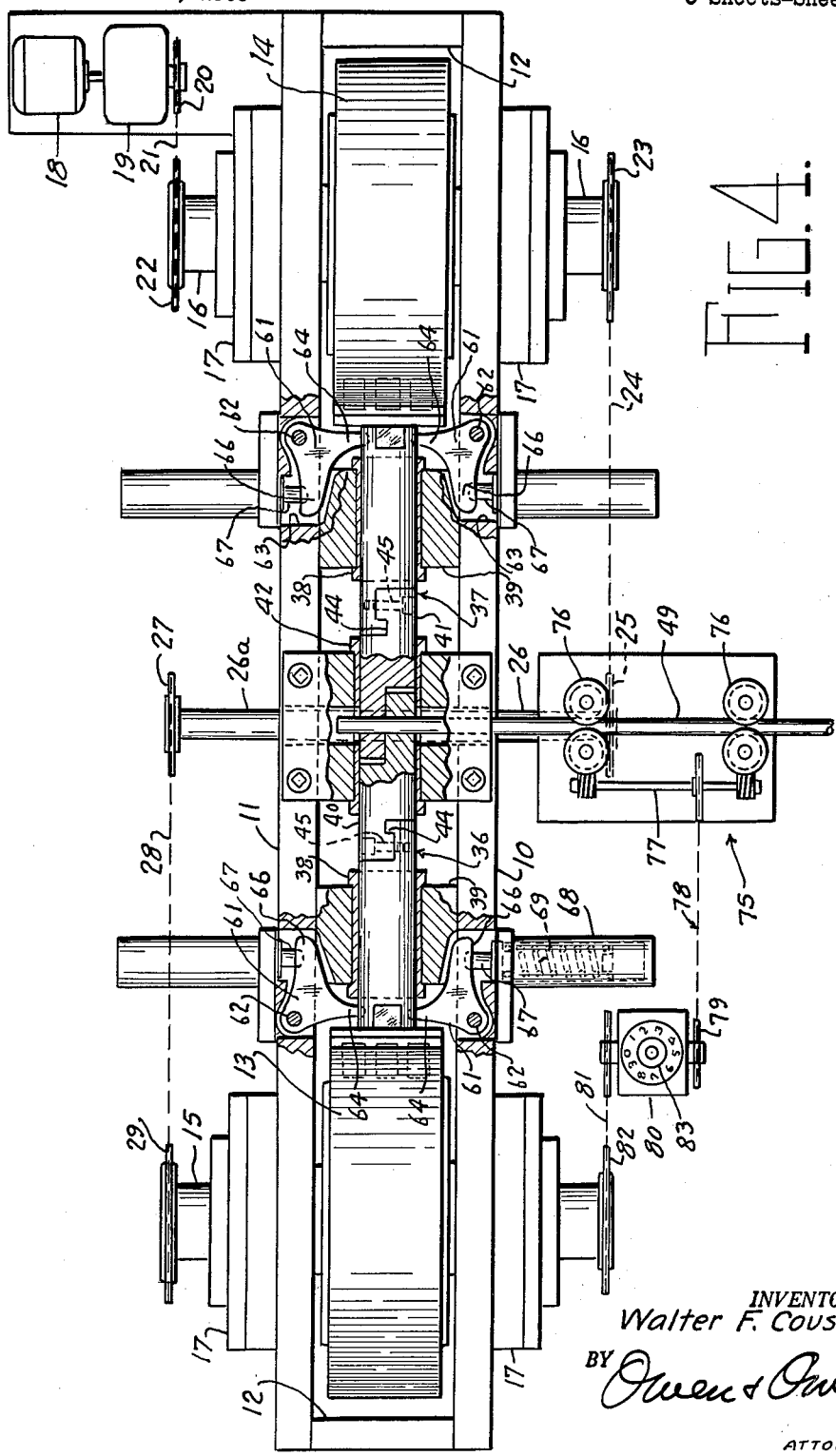

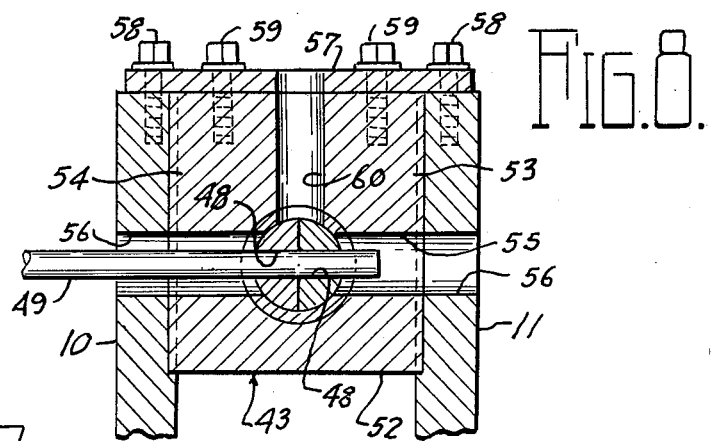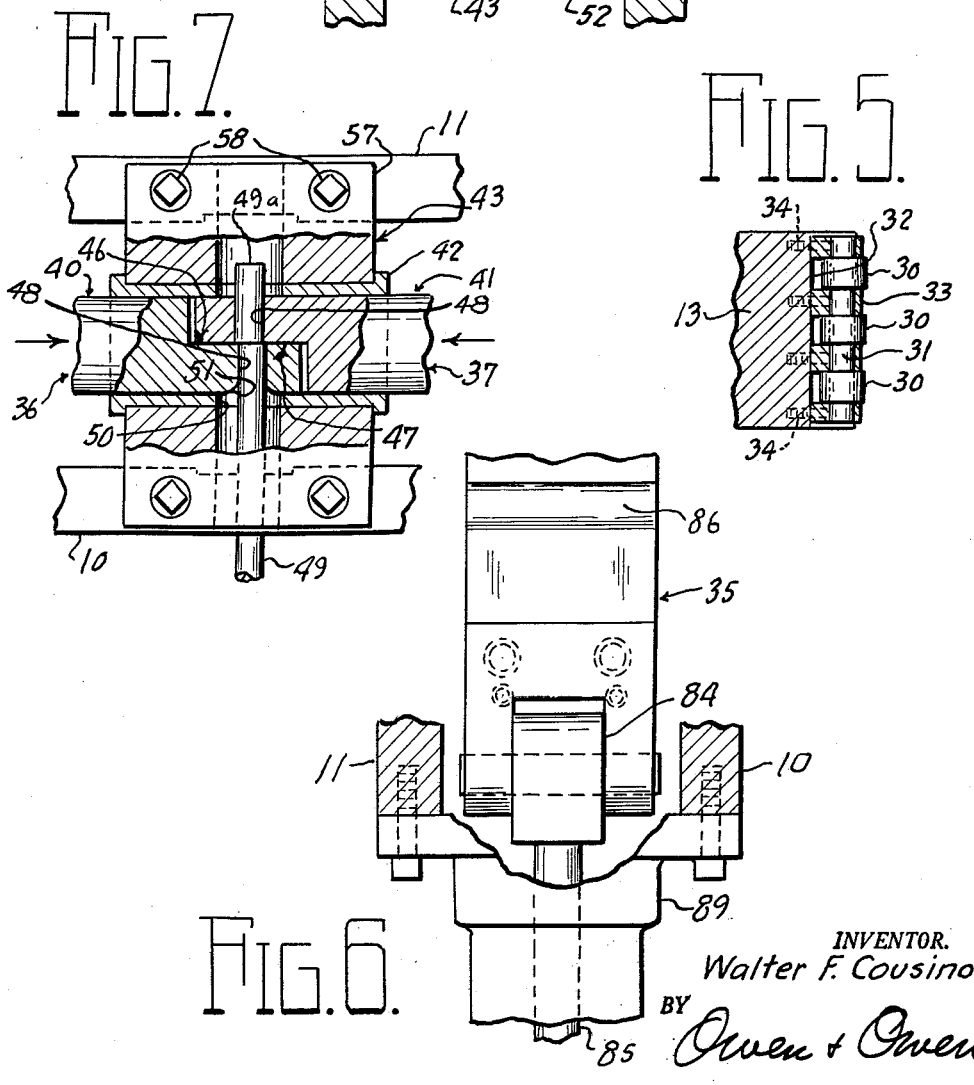

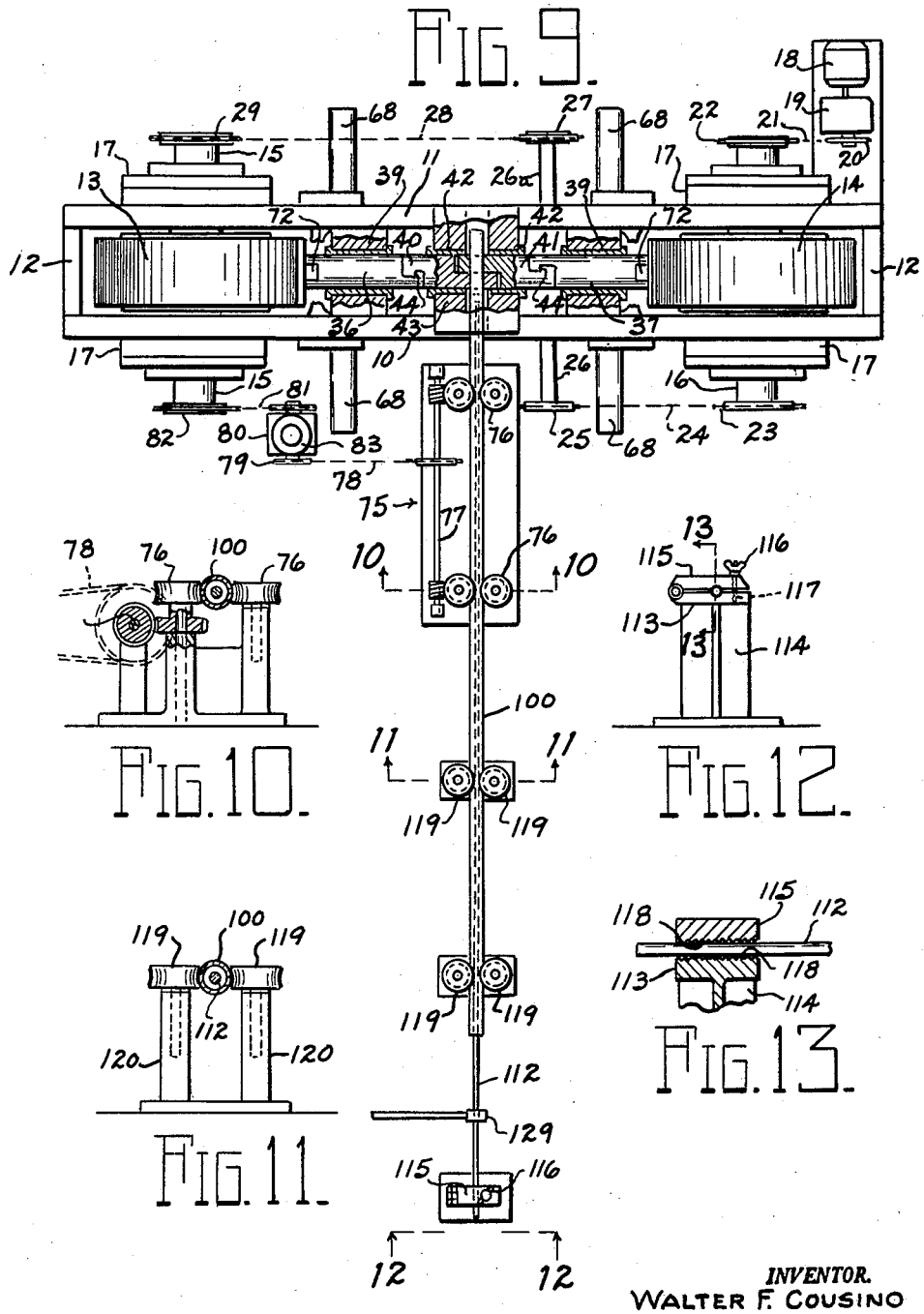

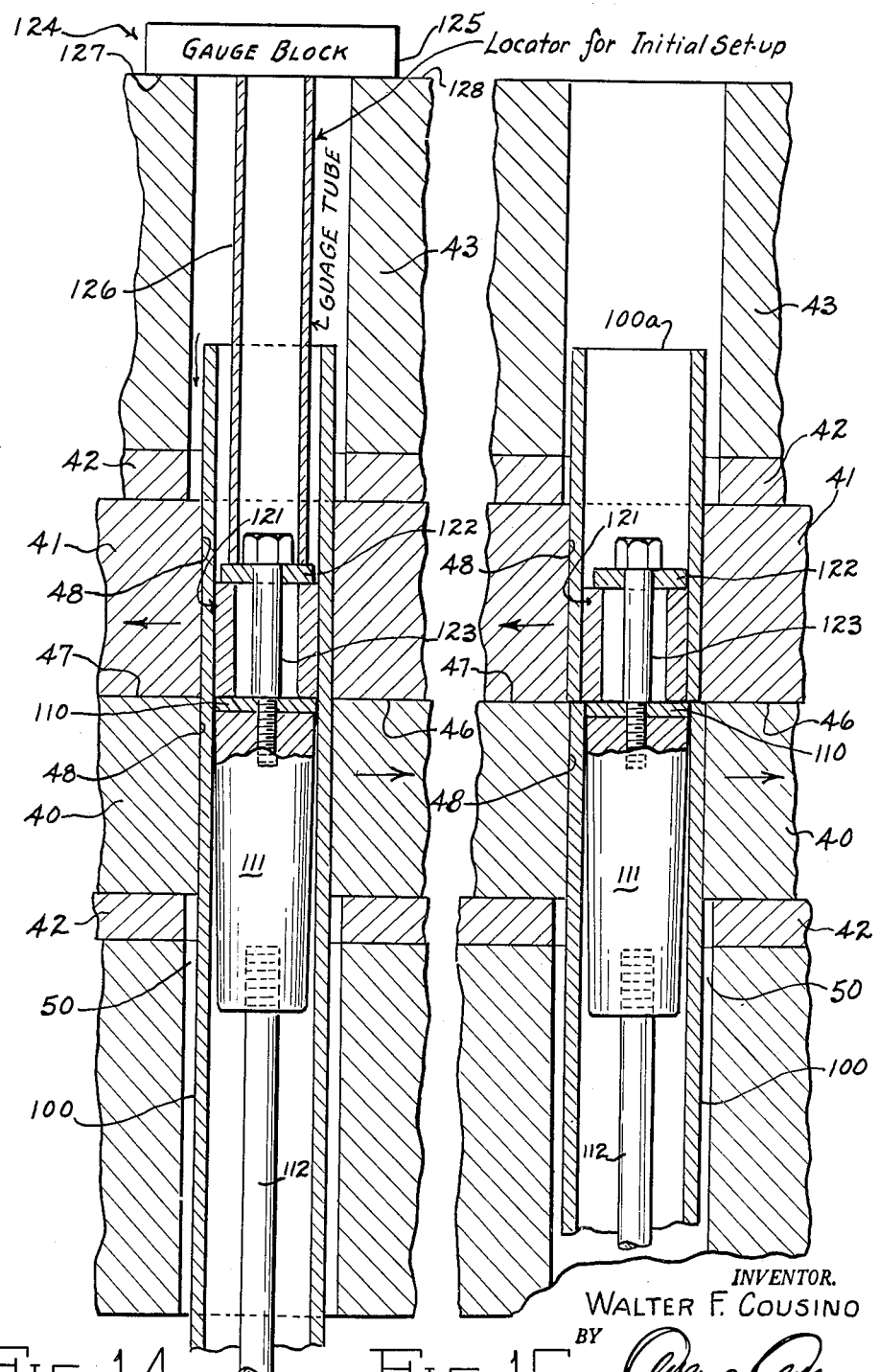

United States Patent Office 3,089,368
Patented May 14, 1963

3,089,368
METHOD AND APPARATUS FOR CUTTING OFF ELONGATED MATERIALS
Walter F. Cousino, Toledo, Ohio, assignor to Hydro-Coin, Inc., Toledo, Ohio, a corporation of Ohio
Filed Jan. 21, 1963, Ser. No. 253,527
12 Claims. (Cl. 83—1)

This invention relates to a method and apparatus for cutting of elongated materials such as bar stock tubing, angles, and shapes of various cross sections, and more particularly to cutting off such elongated materials by high impact applied simultaneously to opposite sides of the material, as contrasted to shearing.

The present application is a joint continuation-in-part of my copending application entitled Method and Apparatus for Cutting Off Elongated Materials, Serial Number 817,284 filed June 1, 1959, now abandoned, and my copending application entitled Method and Apparatus for Cutting Off Elongated Tubular Material, Serial Number 10,609 filed February 24, 1960, now abandoned.

I have discovered that an elongated material such as a bar, strip, tube, rod, etc., of material, for examples, steel, brass, aluminum, and other metals, as well as other materials, can be cut off cleanly along a plane perpendicular to its length by delivering to the bar or rod a sharp, high impact blow simultaneously from both sides. The cutting off appears to result because the impact generates a shear line along the plane in which it is delivered and propagates the break or shear line cleanly across the full extent of the material. By thus propagating a clean shear line, the material is cut off in the plane of the force propagation without burrs or deformation of the cross sectional shape of the material being cut.

All such materials will be referred to herein as elongated stock and the term is intended to be inclusive of solid and hollow materials as well as those of irregular and angular cross sections.

It is, therefore, a principal object of this invention to provide a method and an apparatus for cutting off elongated stock by the delivery thereto of a sharp impact in a plane perpendicular to the longitudinal extent of the material being cut off.

It is another object of this invention to provide an apparatus for cutting off elongated stock by simultaneously applying to opposite sides thereof a high impact blow in a plane along which the stock is to be cut off.

Further objects and advantages of the method and apparatus embodying the invention will be better understood from the following specification and from the drawings, in which:

FIG. 1 is a view, partly in elevation and partly in section, and with parts broken away, of an apparatus embodying the invention and suitable for carrying out the method of the invention;

FIG. 2 is a fragmentary, detailed view on a greatly enlarged scale, of impact delivering means of the apparatus shown in FIG. 1;

FIG. 3 is a fragmentary view, with parts broken away, of a portion of the apparatus shown in FIG. 1, in particular, means for absorbing return shock;

FIG. 4 is a plan view of the apparatus shown in FIG. 1, with parts broken away;

FIG. 5 is a fragmentary, horizontal, sectional view on an enlarged scale, taken along the line 5—5 of FIG. 1;

FIG. 6 is a fragmentary view in elevation and with parts broken away, taken from the position indicated by the line 6—6 of FIG. 1, and shown on an enlarged scale;

FIG. 7 is a fragmentary, plan view, with parts broken away, and on an enlarged scale, illustrating the operation of cut-off according to the invention and as performed on an apparatus embodying the invention;

FIG. 8 is a fragmentary, transverse, vertical, sectional view taken along the line 8—8 of FIG. 1 and shown on an enlarged scale;

FIG. 9 is a plan view similar to FIG. 4, but showing another embodiment of the invention adapted to cut off lengths of tubing;

FIG. 10 is a vertical sectional view, with parts broken away, taken along the line 10—10 in FIG. 9, and shown on an enlarged scale;

FIG. 11 is a vertical sectional view taken along the line 11—11 of FIG. 9, and shown on an enlarged scale;

FIG. 12 is a view in elevation taken from the position indicated by the line 12—12 in FIG. 9, and shown on an enlarged scale;

FIG. 13 is a fragmentary, vertical sectional view taken along the line 13—13 in FIG. 12, and shown on a further enlarged scale;

FIG. 14 is a fragmentary, horizontal sectional view in a greatly enlarged scale, illustrating the apparatus for positioning the various parts of the cut off apparatus prior to the cut off operation, and FIG. 15 is a view similar to FIG. 14, showing the operation of cut off according to the invention and as performed on an apparatus embodying the invention.

An apparatus embodying the invention and upon which the method of the invention may be carried out includes a main frame having a front plate 10 and a rear plate 11 parallel thereto, the plates 10 and 11 being rigidly secured to each other in parallelism by end plates 12. A pair of impact drums 13 and 14 are mounted at opposite ends of the apparatus extending between the front and back plates 10 and 11 and carried for rotation by heavy shafts 15 and 16, respectively. The shafts 15 and 16 are keyed to their respective drums 13 and 14 and are journaled for rotation in heavy bearings 17 which are mounted in pairs by the plates 10 and 11. The axes of the shafts 15 and 16 are horizontal, parallel to each other, and perpendicular to the main front and back plates 10 and 11.

The shafts 15 and 16 are rotated in synchronism with each other by a drive mechanism, diagrammatically shown in FIG. 4, which comprises a motor 18 and a gear box 19 having an output sprocket 20 connected by a drive chain 21 to a sprocket 22 secured on the rear end of the shaft 16. A sprocket 23 on the front end of the shaft 16 is connected by a chain 24 to a sprocket 25 on the front end of a jack shaft 26. The jack shaft 26 is journaled in suitable bearings (not shown) and is mounted with its axis of rotation parallel to the axes of two impact drums 13 and 14. The jack shaft 26 connects to a reversing gear box (not shown) through which it rotates a second jack shaft 26a in the opposite direction. A sprocket 27 on the rear end of the second shaft 26a is drivingly connected by a chain 28 to a sprocket 29 secured to the rear end of the shaft 15. Rotation of the drive motor 18 thus rotates the two shafts 15 and 16 in synchronism but in opposite directions. As can best be seen in FIG. 1, the apparatus disclosed in the drawings is so arranged that the impact wheel 14 turns in a clockwise direction and the impact wheel 13 turns in a counterclockwise direction in synchronism with each other.

The impact wheels 13 and 14 are identical with each other except for the reversal of relationships of their component parts and, therefore, the description of one will suffice to describe both. For example, the impact drum 14 is a massive member constructed from a heavy material, such as cast iron, for rigidity, and also to provide inertia which can be stored during each rotation for delivery of a heavy impact to carry out the method of the invention.

Referring particularly to FIG. 2 with respect to the impact drum 14 and to FIG. 5 with respect to the impact drum 13, each of the drums 13 and 14 is provided with several impact delivery rollers 30, three of such rollers being shown in the drawings on each drum. Each of the sets of delivery rollers 30 is rigidly carried by its respective drum 13 or 14 by being mounted upon an axially extending pin 31 rigidly mounted in a recess 32 in the periphery of the drum 13 or 14 by a mount 33 which is held in place in the recess 32 by a plurality of machine screws 34. As can best be seen in FIGS. 2 and 5, the cylindrical peripheries of the rollers 30 protrude radially beyond both the outer surfaces of the mounts 33 and the peripheries of the drums 13 or 14.

The impact drums 13 and 14, through their delivery rollers 30, deliver simultaneous high impact blows for each revolution to force transfer arms 35 (see also FIG. 6), so mounted as to be positionable adjacent the peripheries of their respective one of the drums 13 or 14 and in contact with the end of one of a pair of opposed impact hammers, generally indicated at 36 and 37. Of course, if desired, the drums 13 and 14 may each have more than one set of impact rollers 30 if it is desired to deliver more than one impact per revolution thereof. The hammers 36 and 37 are mounted for opposed axial movement on a common axis by tubular slides 38 which are, in turn, rigidly held in alignment by cross blocks 39 extending between the front and back plates 10 and 11.

The hammers 36 and 37 have removable heads 40 and 41, respectively (see also FIGS. 7 and 8), the heads 40 and 41 being, in turn, carried by a tubular guide 42 which is removably mounted in axial alignment with the slides 38 by a cross block generally indicated at 43. The outer ends of the heads 40 and 41 are rigidly secured to the inner ends of the bodies of the hammers 36 and 37 by overlaps 44 and are held together by transversely extending machine screws 45.

The inner ends of the hammer heads 40 and 41 (FIGS. 7 and 8) are overlapped with each other, being milled away to form mutually engaging flats 46 and 47, respectively, which lie in the vertical axial plane of the hammers 36 and 37. The hammer heads 40 and 41 are overlapped to an extent less than the axial lengths of the two flats 46 and 47.

The embodiment of the apparatus shown in the drawings is designed for the purpose of cutting off round, solid, bar stock. Each of the hammer heads 40 and 41 is pierced by a bore 48 extending diametrically normal to the respective flat 46 or 47, the bores 48 being aligned at rest position for the reception of a bar of stock 49. The diameter of the bores 48 is only slightly larger than the outside diameter of the stock 49 shown in position in the drawings.

If the elongated material to be cut off has other than a circular cross section, then, in place of the bores 48, the hammer heads 40 and 41 would be transversely pierced with openings complementing the cross section of the stock to be cut off. For example, if the stock to be cut off were an angle iron, then the two hammer heads 40 and 41 would be pierced with a transversely extending angular opening. If the bar stock to be cut off were tubular, then, of course, bores such as the bores 48 would be utilized with the diameter thereof being but slightly larger than the outside diameter of the tubular stock to be cut off.

Because the hammer heads 40 and 41 are connected to the respective bodies of their hammers 36 and 37 by the overlaps 44 and held in such connected relationship by the transversely extending screws 45, additional hammer heads 40 and 41 may be provided for various sizes and cross sectional configurations of different types of bar stock to be cut off according to the method and upon apparatus embodying the invention, and by substituting one set of hammer heads 40 and 41 for another, a single machine may be modified to handle elongated materials of many different cross sections. The particular selection of a solid circular bar stock for purposes of illustration herein is not intended to limit the utilization or scope of the invention in any manner.

The walls of the tubular guide 42 have side openings 50 therein, the openings 50 being aligned with each other and aligned with the bores 48 and, if desired, the outer end of the bore 48 in the hammer head 40 may be flared as indicated by the reference number 51, to facilitate the initial insertion of the bar 49 into the bores 48.

The cross block 43 comprises a base member 52 (FIG. 8) and two upper members 53 and 54 all of which are keyed to the inner faces of the front plate 10 and back plate 11. The upper surface of the base member 52 and the lower, inner corners of the upper members 53 and 54 are cut away to receive the guide 42 and are also milled to form a fore-and-aft channel 55 aligned with the openings 50 in the guide 42. Similar openings 56 are bored or drilled in the front and back plates 10 and 11 in alignment with the fore-and-aft channel 55. The upper members 53 and 54 are removably mounted in position and rigidly held in place by a retainer plate 57 extending across the tops of the front and back plates 10 and 11 and rigidly secured to each by machine screws 58, the plate 57 being, in turn, rigidly connected to the upper members 53 and 54 by similar screws 59. If desired, a vertical inspection bore 60 may be formed through the plate 57, the upper members 53 and 54 and the guide 42 to permit inspection of the movement of the hammer heads 40 and 41 during operation.

When the impact drums 13 and 14 are rotated, as described above, their impact delivery rollers 30 strike the upper ends of the transfer arms 35 and the impact is delivered axially to the outer ends of the two impact hammers 36 and 37. The impact is transferred directly to the hammer heads 40 and 41 and, through the walls of the bores 48 engaging the bar stock 49, is delivered to opposite sides of the bar stock 49 in the plane established by the engaging flats 46 and 47. I have discovered that a clean planar line of shear is propagated transversely across the bar stock by movement of the hammer heads 40 and 41 only to the extent of about five to seven percent of the diameter of solid bar stock such as the bar stock 49. The hammer heads 40 and 41 do not move relative to each other a distance sufficient to shear the bar stock in the manner of opposed knives or shears of the prior art. In FIGURE 7, the hammer heads 40 and 41 are illustrated as being at the inner limits of their movement and a severed piece of bar stock 49a is shown as being displaced laterally with respect to the main piece of bar stock 49. The degree of displacement illustrated in FIGURE 7 is not intended to show the actual displacement occurring during an impact shearing operation, but is only illustrative of the movement which takes place (to a lesser degree) at the time of the delivery of the impact.

The axial movement of the impact hammers 36 and 37 is controlled by two mechanisms. The first of these functions to return the impact hammers 36 and 37 outwardly after the delivery thereby of an impact to the elongated stock being cut. This return mechanism comprises a pair of bell cranks 61 for each of the hammers 36 and 37. The bell cranks 61 (FIG. 4) are pivotally mounted upon vertical pins 62 that are set in recesses 63 cut in the front and back plates 10 and 11. Fingers 64 on the inner ends of the cranks 61 are engaged in notches 65 cut in the sides of the impact hammers 36 and 37 near their outer ends. The opposite arm 66 of each of the bell cranks 61 is recessed to receive the end of a co-operating spring plunger 67 slidingly mounted in an outwardly extending dash pot 68, the plunger 67 being urged inwardly by a coiled spring 69. The springs 69 are compressed by the inward movement of the impact hammers 36 and 37 at the time of impact delivery and, immediately thereafter, expand, swinging their respective bell cranks 61 to move the impact hammers 36 and 37 outwardly.

Outward movement of the impact hammers 36 and 37 is limited by a pair of adjustable stops 70 (FIGS. 1 and 2) mounted on the tops of the cross blocks 39 and having downwardly turned fingers 71 which are engaged by shoulders 72 milled in the upper end surfaces of the hammers 36 and 37. The stops 70 are adjustable axially of the impact hammers 36 and 37, each being locked in adjusted position by a machine screw 73 which extends through an elongated slot 74 on the respective stop 70 and is secured in the respective cross block 39. The stops 70 function to limit the outward movement of the hammer heads 40 and 41 so that they stop with their respective bores 48 aligned with each other. When hammer heads 40 and 41 having bores of different configurations are employed, the stops 70 are re-adjusted to establish alignment of the bores therein.

After each cut-off operation, i.e., after each delivery of an impact from the impact drums 13 and 14 through their impact rollers 30 and the transfer arms 35 to the hammers 36 and 37, the bar stock 49 is fed axially through the bores 48 a distance corresponding to the length of the piece to be cut off. Feeding mechanism, diagrammatically indicated by the reference number 75 in FIG. 4, comprises grooved feeding rollers 76 driven from a jack shaft 77 which is, in turn, rotated by a chain 78 engaged with an output sprocket 79 of a variable gear box 80. The variable gear box 80 is driven by a drive chain 81 from a sprocket 82 on the forward end of the shaft 15. The variable gear box 80 is illustrated as being provided with an index wheel graduated in inches, so that the operator may rotate the index wheel 83 to change the gear ratio and thus the ratio of the drive between the impact delivery shaft 15 and the stock feeding rollers 76 to advance the stock the selected distance between impacts. The particular stock feeding mechanism selected to be employed with apparatus embodying the invention, and according to the method of the invention, is not material, it being necessary only that the stock feeding mechanism be designed and adapted to feed the stock longitudinally a selected distance between successive impacts.

Each of the transfer arms 35 (see FIGS. 1 and 6) is pivotally mounted by a trunnion 84 on the upper end of a vertically slidable rod 85. The arm 35 has an arcuate contact rib 86 (see also FIG. 2) which bears against the outer end of its respective hammer 36 or 37. The outer face of the upper end of the arm 35 has a curved surface 87 which is eccentric to the respective one of the drums 13 or 14. The surface 87 may indeed have an increasing rate of curvature to accelerate its displacement by the rollers 30. Therefore, the path of movement of the outer surfaces of the impact rollers 30 and the surface 87 are converging, so that, as is best seen in FIG. 2, when the impact rollers 30 move upwardly into engagement with the surfaces 87 of the arms 35 they violently thrust the arms 35 and, therefore, the hammers 36 and 37 inwardly.

The supporting rods 85 are shiftable between upper positions, shown in FIG. 1, and lower positions which withdraw the upper ends of the arms 35 sufficiently so that the impact rollers 30 do not engage their arcuate faces 87. Each of the rods 85 is slidable in a tubular guide housing 88, the guide housings 88 being supported by cross brackets 89 which are secured to the under sides of the front and back plates 10 and 11. A thrust pin 90 is threaded into the lower end of each of the rods 85 and is connected to a diaphragm 91 of an air chamber 92. When air under pressure is fed into the chamber 92, the diaphragm 91 is thrust upwardly, pushing the pin 90 and rod 85 to lift the upper end of the transfer arm 35 into the position illustrated in FIGURE 2 where it transfers impacts from its respective cylinder 13 or 14 to the end of its respective hammer 36 or 37. When air is exhausted from the chamber 92, the diaphragm is pulled downwardly a distance such that the arcuate surface 87 is no longer struck by the impact rollers 30. In this position of the arms 35, the impact rollers 13 and 14 may continue to rotate but no impacts are delivered to the hammers 36 and 37.

The arm 35 is held tightly against the end of its respective hammer 36 or 37 by a small piston 93 (FIG. 3) which is mounted in a cylinder 94 bored in a stop plate 95. The lower inside corner of the stop plate 95 is engaged by a shoulder 96 (FIG. 1) on the trunnion 84 to limit the upward movement of the arm 35. Air under pressure is applied through an air line 97 to the interior of the cylinder 94 to thrust the piston 93 against the side of the arm 35 and, in turn, to hold the rib 86 of the arm 35 tightly against the hammer 36 or 37. Equally important, when the cranks 61 return the hammers 36 and 37 outwardly, the pistons 93 are thrust into their cylinders 94 against the air pressure therein to absorb the shock of the return movements.

While the particular speed of rotation of the drums 13 and 14 is not critical, they should be rotated at sufficient speed so that the inward movement of the hammers 36 and 37 takes place in a very small fraction of a second. For example, if the drums 13 and 14 are rotated at 300 r.p.m., and have diameters of, say, 20 inches, the rollers 30 travel at a speed of about 300 inches per second. The arcuate faces 87 of the arms 35 might be one inch in length and in contact with the rollers 30 for, say, ¼" to ½". Under these conditions, the actual hammer movement would take place in less than ⅙₀₀th part of a second. With the two opposed hammers 36 and 37 moving simultaneously, the impact is actually of less than one thousandth of a second effective duration.

The embodiment shown in FIGS. 9–15 is generally similar to that previously described above and differs therefrom principally in that it is designed to cut off lengths of tubing 100 instead of solid stock such as the bar stock 49. Those portions of the embodiment shown in FIGS. 9–15 which are similar to corresponding portions of FIGS. 1–8 are designated by like reference numerals and will not be described again.

In the embodiment shown in FIGS. 9–15, means are provided in the form of a supporting member 110 for engaging the inner surface of the tubular stock 100 which has a relatively thin wall section that would normally be deformed by the violent impact of the hammer heads 40 and 41. As shown most clearly in FIGS. 14 and 15, the diameter of the supporting member 110 is substantially the same as the inside diameter of the tubular stock 100. However, sufficient clearance is provided between the supporting member 110 and the tubular stock 100 to permit the feeding mechanism 75 to advance the tubular stock 100 after each cut. It will be appreciated that to be effective, the supporting member 110 must engage the inner surface of the tubular stock 100 immediately adjacent the cut-off plane defined by the engaging flats 46 and 47 of the hammer heads 40 and 41. If the supporting member 110 engages a portion of the inner surface of the tubular stock 100 sufficiently removed from the plane of cut-off, the tubular stock 100 will be deformed by the impact hammer heads 40 and 41. Likewise, if the supporting member 110 extends into the plane of cut-off, thin walls of the tubular stock 100 will be crushed, and the supporting member itself may even be cut off by the violent impact of the hammer heads 40 and 41.

In order to maintain the supporting member 110 in its proper position immediately adjacent the plane of cut-off, a plug 111 is provided within the bore 48 of the head 40, and as shown in FIG. 14 the plug 111 is mounted on the end of a rod 112 which extends through the tubular stock 100. The plug 111 is tapered to permit the tubular stock 100 to be easily fed thereover by the feeding mechanism 75. One end of the rod 112 is threaded into the plug 111 as shown in FIGS. 14 and 15, and the opposite end of this rod extends outwardly from the tubular stock 100.

As shown in FIGS. 9 and 12, the rod 112 is gripped between a grooved plate 113 on a rigid column 114 and a pivoted grooved hold-down bar 115. For example, the bar 115 may be clamped tightly against the rod 112 by a wing nut 116 threaded on a stud 117 extending through the hold-down bar 115. Longitudinal movement of the rod 112 is prevented by gripping jaws 118 machined in both the plate 113 and bar 115.

In order to support the tubular stock 100, as well as maintain it in alignment with the openings 50 in the guides 42 and the rod 112, grooved idler wheels 119 are positioned along the tubular stock 100 as shown in FIG. 9. The idler wheels 119 are rotatably mounted on vertical supporting columns 120 which likewise prevent the tubular stock 100 from being bent or otherwise damaged while it is being advanced by the feeding mechanism 75.

Another feature of the invention is the provision of a hollow, cylindrical reinforcing member 121 shown in FIGS. 14 and 15 which likewise engages the inner surface of the tubular stock 100 during the cutting off operation. This reinforcing member 121 is positioned within the bore 48 of the head 41 and is secured to the supporting member 110 by means of a plate 122 having a suitable aperture formed therein for receiving a bolt 123 that is threaded into the plug 111. The plate 122 has a diameter less than the inside diameter of the tubing 100 and the diameter of the member 121. The bolt 123 not only secures the reinforcing member 121 to the supporting member 110 perpendicular to the plane of cut-off, but also secures the supporting member 110 to the plug 111. Referring to FIGS. 14 and 15, it is seen that the diameter of the reinforcing member 121 is only enough less than the inside diameter of the tubular stock 100 to permit its insertion through the stock. The member 121 supports the cut-off portion of the stock in the same manner as the supporting member 110 supports the end of the tubing 100 during cut off. The smaller diameter of the plate 122, which is fixed by the bolt 123 in position relative to the member 110 and plug 111, provides clearance for movement of the cut-off section of the stock relative to the main portion of the tubing 100.

Locating means 124 comprising a gauge block 125 having a gauge tube 126 secured thereto is utilized to accurately position the supporting member immediately adjacent the plane of cut-off defined by the flats 46 and 47. As shown in FIG. 14, the gauge block 125 has an accurately machined surface 127 which abuts against the outer surface 128 of the cross block 43 when the gauge tube 126 is inserted into the bore 48 of the head 41 and opening 50 in the guide 42 through the cross block 43. The length of the gauge tube 126 is equal to the sum of the thicknesses of the head 41, guide 42 and cross block 43 less the sum of the length of the reinforcing member 121 and the thickness of the plate 122.

In operation the bores 48 of the heads 40 and 41 are moved into alignment and the gauge tube 126 is inserted into the bore 48 as shown in FIG. 14. A handle 129 is secured to the rod 112 and the plug 111 is inserted into the bore 48 of the head 40 by advancing the rod 112 with the handle 129 until the plate 122 abuts against the end of the gauge tube 126. The hold-down bar 115 is locked into place with the wing nut 116 and the locating means 124 is removed from the cross block 43. A length of tubular stock 100 is then fed completely through the cross block 43, the guide 42 and the heads 40 and 41 until it is supported by the plug 111 and the idler rolls 119. The proper cut-off length is set on the index wheel 83 and the motor 18 is started.

Because the hammer heads 40 and 41 are connected to the respective bodies of their hammers 36 and 37 by the overlaps 44, additional hammer heads 40 and 41 may be provided for various sizes of tubular stock to be cut off according to the method and upon the apparatus embodying the invention. Likewise, different size plugs 111 carrying different size supporting members 110 and reinforcing members 121 may likewise be substituted. Thus, a single machine may be modified to handle tubular stock of many different sizes.

Having described by invention I claim:

1. A method for cutting off elongated stock which comprises engaging opposite sides of said stock with diametrically opposed surfaces that are complementary to said stock and that terminate in a common plane normal to the longitudinal axis of said stock and simultaneously therewith delivering at a substantially linear rate substantially instantaneous, forceful, radially inwardly directed and opposite impacts to said surfaces and substantially instantaneously thereafter disengaging said surfaces from said opposite sides of said stock, whereby said stock is cleanly severed along said common plane.

2. A method according to claim 1 in which said surfaces are moved inwardly toward each other by said impacts substantially less than one-quarter of the distance therebetween when engaged with opposite sides of said stock.

3. In the method of claim 1 as used for cutting off elongated tubular stock, the improvement which comprises: engaging the inner surface of the remainder portion of said stock with a supporting surface which is complementary to said internal surface of said stock and which terminates in said common plane and simultaneously engaging the inner surface of the portion of said stock to be cut off with a second supporting surface which is complementary to said internal surface of said stock and which also terminates in said common plane, said supporting surfaces being engaged with said internal surfaces substantially simultaneously with delivering the radially inwardly directed and opposite impacts to the outer side of said stock.

4. Apparatus for cutting off elongated stock comprising a pair of diametrically opposed impact hammers movable along a common path, said hammers having recesses therein extending perpendicularly to said path and having surfaces complementary to opposite sides of said stock, said surfaces terminating in a common plane normal to the longitudinal axis of said stock, means for simultaneously engaging said recesses with said stock and delivering at a substantially linear rate substantially instantaneous, inwardly directed and opposite impacts to said hammers, means for restraining movement of said hammers to substantially less than one-quarter the distance between opposite sides of said stock and means for substantially instantaneously thereafter disengaging said surfaces of said hammers from said stock.

5. Apparatus according to claim 4 in which said hammers have removable heads on their ends and the recesses are formed in said heads.

6. Apparatus according to claim 4 in which the inner ends of said hammers are overlapped and the overlapped portions thereof engage each other in a common plane that is normal to the longitudinal axis of said bar stock.

7. Apparatus according to claim 4 and means for advancing said elongated stock longitudinally a measured distance between impacts.

8. In apparatus according to claim 4 for cutting off elongated tubular stock the improvement which comprises a pair of internal support members located within said tubular stock, one of said pair of internal support members being positioned in the remainder portion of said tubular stock, and the other of said pair of internal support members being positioned in the portion of said tubular stock to be cut off, said internal support members having exterior surfaces which are complementary to the interior surfaces of said tubular stock adjacent opposite sides of said common plane and which terminate in said common plane.

9. Apparatus according to claim 4 in which the means for delivering impacts to said hammers comprises a pair of rotatable drums having radially protruding elements for delivering impacts to the ends of said hammers when said drums are rotated and means for rotating said drums in synchronism, said elements protruding from said drums radially a distance for displacing said hammers substantially less than one-quarter of the distance between opposite sides of said stock.

10. Apparatus according to claim 9 and impact transfer members removably positioned at the ends of said hammers and engageable by said radially protruding elements when in operative position for transferring impacts to said hammers.

11. Apparatus for severing elongated stock comprising a pair of diametrically opposed impact hammers movable oppositely along a common path normal to the longitudinal axis of said stock between a first position and a second position, said positions being spaced from each other a distance substantially less than one-quarter of the thickness of said stock along the line of movement of said hammers, said hammers each having an opening therein extending perpendicular to said path, said openings being slightly larger than the cross section of said stock and having surfaces complementary to opposite sides of said stock, said surfaces terminating in a common plane normal to the longitudinal axis of said stock, said openings being axially aligned with each other when said hammers are in said first position for reception of said stock therethrough, means for simultaneously and substantially instantaneously delivering at a substantially linear rate inwardly directed and opposite impacts to said hammers for moving said hammers to said second position and means for substantially instantaneously thereafter returning said hammers to said first position whereby said stock is cleanly severed along said common plane.

12. Apparatus according to claim 11 and resilient means for restraining the relative movement of said hammers upon such impacts to substantially less than one-quarter of the material thickness of said stock.

References Cited in the file of this patent

UNITED STATES PATENTS

| 488,659 | McCool | Dec. 27, 1892 |
| 601,593 | Shuster | Mar. 29, 1898 |
| 717,706 | McCool | Jan. 6, 1903 |
| 1,715,138 | Lothrop | May 28, 1929 |
| 1,844,766 | Keller | Feb. 9, 1932 |
| 2,038,255 | Worthington | Apr. 21, 1936 |
| 2,136,831 | Vuilleumier | Nov. 15, 1938 |
| 2,510,788 | Willett | June 6, 1950 |
| 2,538,425 | Nolan | Jan. 16, 1951 |
| 2,627,921 | Brehm | Feb. 10, 1953 |
| 2,837,156 | Brehm | June 3, 1958 |
| 2,856,997 | Lafferty | Oct. 21, 1958 |

FOREIGN PATENTS

| 529,451 | Great Britain | Nov. 21, 1940 |